US008233269B2

United States Patent
Hotary et al.

(10) Patent No.: US 8,233,269 B2
(45) Date of Patent: Jul. 31, 2012

(54) DISPLAY APPARATUS FOR HOUSING AT LEAST ONE ELECTRONIC DEVICE IN A VEHICLE

(75) Inventors: James Hotary, Holland, MI (US); Greg Brncick, Holland, MI (US)

(73) Assignee: Faurecia Interior Systems, Inc., Auburn Hills, MN (US)

( * ) Notice: Subject to any disclaimer, the term of this patent is extended or adjusted under 35 U.S.C. 154(b) by 512 days.

(21) Appl. No.: 12/619,772

(22) Filed: Nov. 17, 2009

(65) Prior Publication Data

US 2010/0124005 A1   May 20, 2010

Related U.S. Application Data

(60) Provisional application No. 61/115,323, filed on Nov. 17, 2008.

(51) Int. Cl.
*H05K 5/00* (2006.01)
*H05K 7/00* (2006.01)

(52) U.S. Cl. .................. 361/679.01; 248/27.1; 296/37.8

(58) Field of Classification Search .................. 361/728, 361/729, 730, 756, 727, 741, 786, 802, 788, 361/825, 826, 679.01; 174/50, 520; 439/535, 439/296, 297; 248/906, 27.1; 33/528; 220/4.02; 296/24.34, 37.8

See application file for complete search history.

(56) References Cited

U.S. PATENT DOCUMENTS

| | | | | |
|---|---|---|---|---|
| 5,102,181 A | * | 4/1992 | Pinkney | 296/37.12 |
| 5,184,489 A | * | 2/1993 | Squires et al. | 70/58 |
| 5,996,866 A | * | 12/1999 | Susko et al. | 224/281 |
| 6,158,795 A | * | 12/2000 | Gray et al. | 296/37.8 |
| 7,277,239 B2 | * | 10/2007 | Carnevali | 359/802 |
| 7,967,262 B2 | * | 6/2011 | O'Brien et al. | 248/205.5 |
| 2006/0277555 A1 | * | 12/2006 | Howard et al. | 720/600 |

FOREIGN PATENT DOCUMENTS

DE    4109475 A1 * 9/1992

* cited by examiner

*Primary Examiner* — Chau Nguyen
*Assistant Examiner* — Theron Milliser
(74) *Attorney, Agent, or Firm* — Matthew B. Dernier, Esq.; Gibson & Dernier LLP

(57) ABSTRACT

An apparatus is provided with an enclosure defining an inner volume and including a first aperture, and a housing containing the enclosure and including a second aperture. The enclosure may be rotatable such that the first and second apertures may be in registration to permit insertion of the electronic device, and the first and second apertures may not be in registration to prevent insertion and/or removal of the electronic device. An actuating element may rotate the enclosure into a desired orientation within a vehicle. The apparatus may improve the viewing quality of information displayed on the electronic device. The electronic device may be secured within the vehicle without having to supervise the device when the vehicle is parked, turned off, etc. The apparatus may employ environmental controls to control/condition temperature, humidity, and/or vibration within a desired range to protect the electronic device from becoming temporarily or permanently non-functional.

21 Claims, 6 Drawing Sheets

DISPLAY APPARATUS FOR HOUSING AT LEAST ONE ELECTRONIC DEVICE IN A VEHICLE

CROSS-REFERENCE TO RELATED APPLICATIONS

This application claims the benefit of U.S. Provisional Patent Application No. 61/115,323, filed Nov. 17, 2008, the entirety of which is incorporated herein by reference.

FIELD OF THE INVENTION

The present invention is directed to display devices for housing, viewing, and/or rotating one or more electronic devices in a vehicle, or the like. The present invention is also directed to rotating electronic display devices, and employs security features and/or climate control/conditioning features to protect the one or more electronic devices from a range of threats, such as, but not limited to, extreme temperatures, humidity, theft, etc.

BACKGROUND OF THE INVENTION

Various enclosures for an electronic device have been designed to specifically house the electronic device for display. A commonly known device is shown in FIG. 1. In order to display large amounts of visual information, automakers typically integrate a large reconfigurable display screen. This screen is used to display complex information to the driver and passengers. Unfortunately, these large displays take up considerable room (a typical automotive display measures 7" or more in diagonal), and are typically expensive and relatively heavy.

Electronic devices, such as portable media players, personal navigation systems, mobile phones, or the like, have become very popular for use in vehicles. As the popularity of such electronic devices has increased in the last several years, new challenges have emerged.

As automakers are under considerable pressure to reduce vehicle mass and size (while at the same time increasing useful interior space), interior components need to be downsized. Unfortunately, if information display sizes decrease, typically so does the legibility of its information.

As such, a challenge exists to create a display housing apparatus that provides legible information while downsizing interior components and also adjusting the environment of the electronic device enclosed in the display housing apparatus (e.g., by rotating, shifting, etc. the device).

An additional challenge exists to provide security for the electronic devices when left in a parked or unsupervised car. Various products have been developed to secure portable electronic devices when left in a vehicle. Unfortunately, these products have always been intrusive and not well integrated into the vehicle interior. For instance, a driver and/or a passenger may place one or more devices in a vehicle so that the device is out of sight. However, if the device is not firmly secured to the vehicle interior, then the device may still be stolen. Alternatively, if the device is firmly secured to the vehicle, previous products are intrusive in that the products do not provide an easy way to lock and unlock a device, and do not provide a way to place the device out of sight or out of the driver's and/or passengers' way.

Moreover, various enclosures for electronic devices have been designed to specifically protect the device in the event of extreme climate conditions, such as extreme heat, humidity, etc. A commonly known device is shown in FIG. 2, which shows an enclosure containing phase change materials which help to mitigate the extreme swings in external temperatures, and protect the device from the harsh conditions of the outside environment, such as a desert, or the like. However, an apparatus for controlling or conditioning a climate for electronic devices has not been employed in automotive vehicles.

Many of the popular electronic devices that users may leave in a vehicle, unfortunately, do not meet the durability requirements of OEM integrated vehicle electronics. As such, environmental conditions of concern include extreme temperatures, humidity, vibration, etc. For instance, a driver and/or a passenger may place one or more devices in a vehicle, and such devices may be damaged due to vibration caused while the vehicle is in motion. Additionally, the devices may also be damaged due to extreme temperatures and/or humidity, especially when a driver and/or passenger leaves the devices in a vehicle for relatively long periods of time. As such, these devices can not be stored in the vehicle without the risk of damaging the devices. In some cases, extreme temperatures will not permanently damage the device, but will render the device temporarily non-functional, such as in below freezing weather.

In view of the above, there is a need in the art for a display apparatus for housing electronic devices, such as hand-held devices, mobile devices, etc., in which a display of the device is easily viewable by a driver and passenger(s).

There is also a need in the art for a display apparatus to provide climate conditioning for electronic devices, such as hand-held devices, mobile devices, etc., in which temperature, humidity, and/or vibration may be controlled, conditioned, and/or mitigated to prevent permanent damage or temporary non-functionality of a mobile device enclosed within the apparatus. It would also be desirable if the same apparatus could control or condition the environment of the mobile device continually, during periods of time, and/or without supervision of a vehicle driver and/or passenger.

There is also a need in the art for a housing display apparatus that secures the enclosed electronic devices, such as mobile or non-mobile, in which the devices are placed out of sight and are firmly secured to the vehicle interior, especially when the devices are not in use and/or when the vehicle is parked. It would also be desirable if the same apparatus could provide an easy way to secure the device to the vehicle after using the device, and to unlock the device from the vehicle before using the device.

SUMMARY OF THE INVENTION

In accordance with one or more embodiments of the present invention, a display apparatus is provided with a vehicle cockpit/Instrument Panel integrated enclosure with an inner volume for receiving at least one electronic device, such as a hand-held device, mobile device, etc., and a housing in which the device may be rotated to utilize a desired orientation for viewing information. An apparatus for securing at least one electronic device within a vehicle may include an enclosure defining an inner volume and including a first aperture for receiving the electronic device into, and removing the electronic device from, the inner volume; and a housing containing the enclosure and including a second aperture. The enclosure may be rotatable within the housing such that: (i) in at least one first rotation position the first and second apertures are in registration with one another and the electronic device may be received within and removed from the inner volume through both apertures, and (ii) in at least one second rotation position the first and second apertures are not in registration with one another and the electronic device may not be received within or removed from the inner volume through both apertures.

The present invention of the instant application allows for the housing and rotation of one or more electronic devices in the vehicle for viewing information on the one or more devices. The apparatus may include an actuating element coupled to, and operating to, rotate the enclosure within the housing. The enclosure may not rotate when the actuating element is not rotating; and the enclosure may rotate when the actuating element rotates. The actuating element may rotate the enclosure automatically to the at least one second rotation position in response to at least one of: the vehicle being shut off, the one or more electronic devices entering a sleep mode due to inactivity, a key being removed from an ignition of the vehicle, and the one or more electronic devices being shut off. An orientation of information displayed on the at least one electronic device may be adjustable by rotation of the enclosure within the housing.

The housing may be integrated within a door, a cockpit/Instrument Panel, an armrest, a center console, and a back of a seat of the vehicle. The enclosure may be removable from the housing such that any of a plurality of enclosures is insertable into the housing and may accommodate one or more different electronic devices. The enclosure and/or the housing may be docked or integrated into a cockpit or Instrument Panel ("IP") of a vehicle, and preferably, the apparatus is permanently integrated into the cockpit or IP of the vehicle.

The apparatus may further include at least one window disposed on the housing and the enclosure such that information displayed on the at least one electronic device is viewable therethrough. The window may at least one of: magnify the information displayed on the at least one electronic device; and become at least partially opaque when the at least one electronic device is at least one of: not being used, in sleep mode, and shut off. The at least one electronic device may be disposed between the window and a back of the enclosure. The window may be an unobscured aperture that does not distort information displayed on a screen of the housed electronic device. The window may be sized and shaped such that it does not permit the at least one electronic device to pass therethrough. The window may include a transparent material that prevents removal of the at least one electronic device from the enclosure. The at least one window may be sized and shaped to permit one of: (i) only a portion of the at least one electronic device to be viewable therethough; (ii) only a display of the at least one electronic device to be viewable therethough; and (iii) substantially all of the electronic device to be viewable therethrough.

The apparatus may further include an ejection mechanism disposed in the enclosure and operating to urge the at least one electronic device out of the enclosure. The ejection mechanism may communicate with the at least one electronic device such that: (i) the ejection mechanism is locked into a first position when the at least one electronic device is received into the inner volume of the enclosure and is pushed a first time against the ejection mechanism; and (ii) the ejection mechanism is unlocked from the first position when the at least one electronic device is pushed a second time against the ejection mechanism, and displays a spring-like effect that pushes the at least one electronic device towards the first and second apertures, when in registration, for removal therefrom.

The apparatus may further include one or more environment-control elements disposed on and/or in at least one of the enclosure and the housing, wherein the one or more environmental-control elements maintain one or more environmental factors within the inner volume of the enclosure to prevent the at least one electronic device from sustaining damage and/or becoming temporarily non-functional. The one or more environmental factors may include at least one of: temperature, humidity, and vibration. The one or more environment-control elements may include at least one of: Peltier cooling or heating devices, resistive element heating devices, phase change materials, phase change materials disposed in a gel pack, desiccant materials, a supplementary heating element, a supplementary cooling element, and active or passive vibration control components.

The present invention of the instant application allows for the safe storage and use of one or more electronic devices in the vehicle regardless of whether the vehicle is parked and/or left unsupervised. The apparatus may further include a locking mechanism that prevents rotation of the enclosure within the housing when actuated. The locking mechanism may include: a receiver within one of the housing and the enclosure; and a locking member operating to slidingly engage the receiver when actuated. The locking member may be engageable within the receiver only when the enclosure is rotated into the at least one second rotation position. The locking mechanism may be actuated by a user of the apparatus, thereby permitting the user to unlock and lock the rotation of the enclosure within the housing.

The present invention of the instant application allows for the first time the safe storage and use of one or more electronic devices in the vehicle during all environmental extremes experienced by the vehicle.

BRIEF DESCRIPTION OF THE DRAWINGS

For the purposes of illustrating the various aspects of the invention, wherein like numerals indicate like elements, there are shown in the drawings simplified forms that may be employed, it being understood, however, that the invention is not limited by or to the precise arrangements and instrumentalities shown, but rather only by the claims. To assist those of ordinary skill in the relevant art in making and using the subject matter hereof, reference is made to the appended drawings and figures, wherein:

DETAILED DESCRIPTION OF THE PRESENT INVENTION

An apparatus including a convenient rotating enclosure is disclosed herein for housing and viewing at least one electronic device in a vehicle. The electronic device may be placed within the apparatus by a driver and/or passenger(s) of a vehicle. The apparatus may be employed in automobiles, planes, trains, trucks, buses, boats, helicopters, submersible vehicles, spacecraft, or the like. In particular, the present invention relates to an apparatus that rotates the electronic device and, thereby, provides a desired configuration for viewing information displayed on the electronic device.

Figure 1:
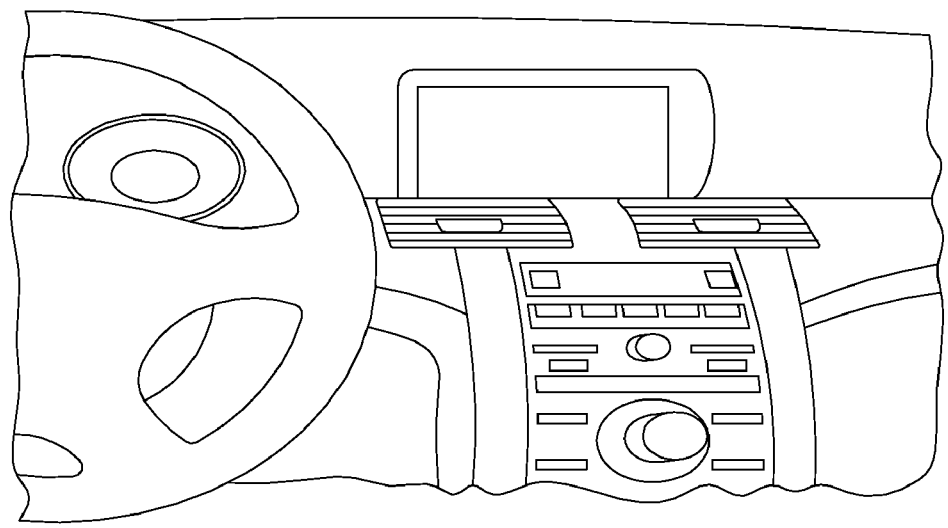
FIG. 1 is a front view of a prior art enclosure for housing a display screen.
Figure 2:
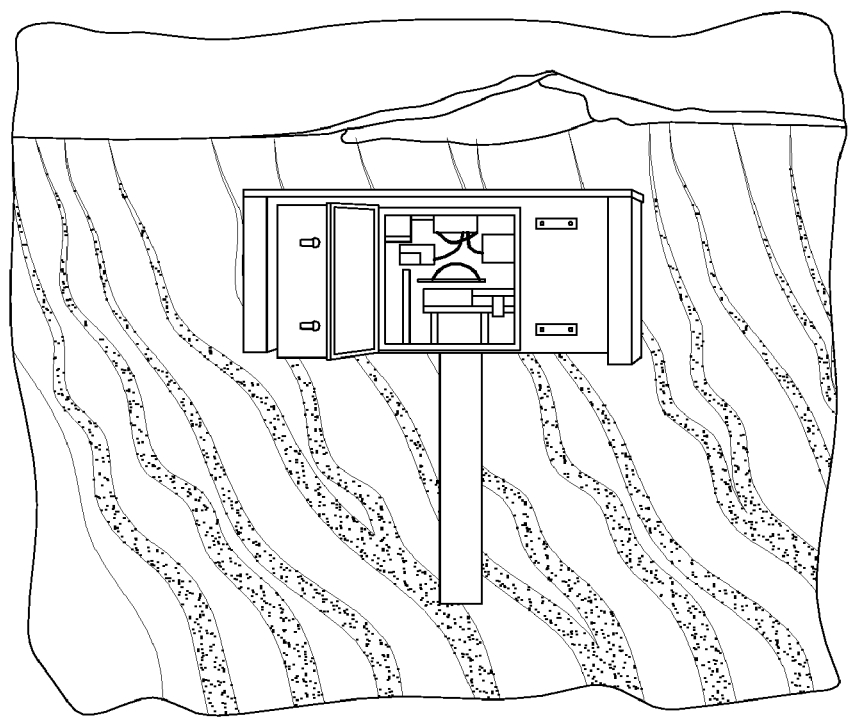
FIG. 2 is a perspective view of a prior art enclosure for protecting electronics in extreme environmental conditions.
Figure 3:
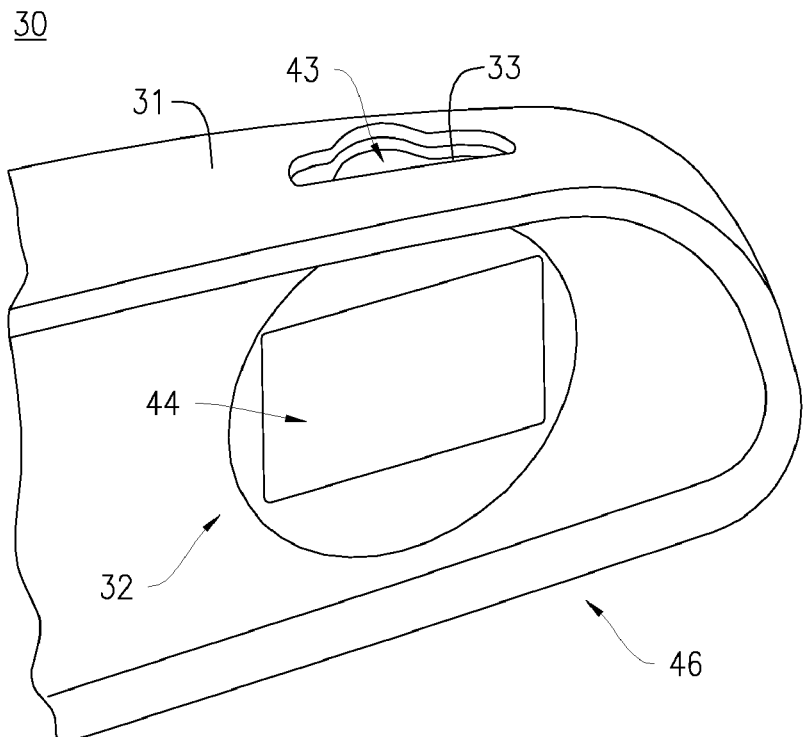
FIG. 3 is perspective view of a housing and an enclosure for storing at least one electronic device in accordance with at least one embodiment of the present invention.
Figure 5:
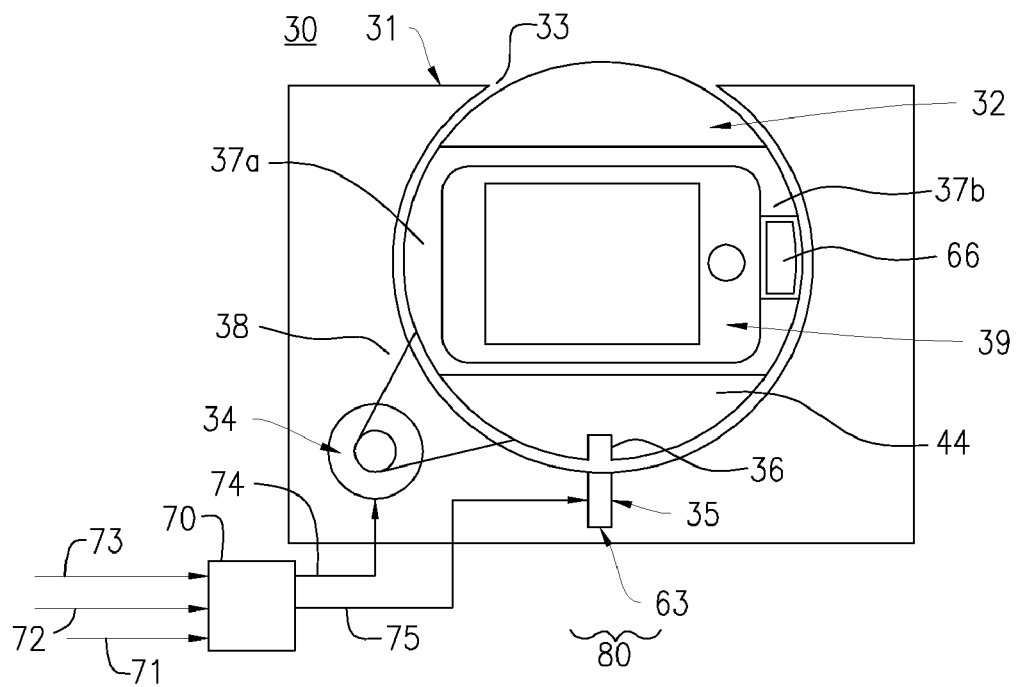
FIG. 5 is a front view of the apparatus of FIG. 3 illustrating an enclosure and housing in rotational and lockable engagement in accordance with at least one embodiment of the present invention.

Turning now to the details of the drawings, FIGS. 3-9 illustrate an apparatus 30 including an enclosure 32 defining an inner volume 47 and a housing 31 at least partially containing the enclosure 32. At least one electronic device 39 may be received into the inner volume 47 of the enclosure 32. The enclosure 32 may include a first aperture 37a and/or 37b (as best seen in FIGS. 4A and 6B) for receiving the electronic device 39 into, and removing the electronic device 39 from, the inner volume 47. As best seen in FIGS. 4B and 6B, the housing 31 may include a second aperture 33. The enclosure 32 may be positioned in at least one first rotation position such that the first aperture 37a (or 37b) and the second aperture 33 are in registration with one another. In such position, the electronic device 39 may be received within and removed from the inner volume 47 through the apertures 37a (or 37b) and 33. Additionally, as best seen in FIGS. 4A, 4B, and 5, the enclosure 32 may be positioned in at least one second rotation position such that the first aperture 37a (or 37b) and the second aperture 33 are not in registration with one another. In such position, the second aperture or slot 33 is sealed and the electronic device 39 may not be received within or removed from the inner volume 47 through the apertures 37a (or 37b) and 33. The housing 31 may be integrated within: a door, a cockpit/Instrument Panel 46, an armrest, a center console, and a back of a seat of the vehicle. Preferably, the housing 31 is integrated within a cockpit/Instrument Panel 46 (as illustrated in FIG. 3).

The apparatus 30 may be docked such that the apparatus 30 is interchangeable with another apparatus that may be modified for use with a different electronic device or the same electronic device 39. The apparatus 30, and any components thereof (such as housing 31, enclosure 32, etc.) may be integrated such that the component(s) looks "disguised" when attached to the vehicle—e.g., looking much like a traditional Instrument Panel display. Any component of the apparatus 30, such as, but not limited to, the enclosure 32, the housing 31, etc., may be customized or standardized for a particular one or more electronic devices 39. The enclosure 32 may be removable from the housing 31 such that any of a plurality of enclosures 32 is insertable into the housing 31, and may accommodate one or more different electronic devices 39. The enclosure 32 may be sized and shaped as a function of at least one of: a predetermined viewing surface area of the information on the at least one electronic device 39; and a surface area of contact between the enclosure 32 and the at least one electronic device 39.

The apparatus 30 may further include an actuating element 34 coupled to, and operating to, rotate the enclosure 32 within the housing 31. For example, the actuating element 34 may rotate the enclosure 32 between the at least one first rotation position and the at least one second rotation position. The coupling or connection between the actuating element 34 and the enclosure 32 may be such that the enclosure 32 does not rotate when the actuating element 34 is not rotating, and the enclosure 32 rotates when the actuating element 34 rotates. As illustrated in FIGS. 5-9, the coupling or connection may be achieved by use of an actuating connector (also referred to as a "cable") 38. The actuating element 34 (e.g., a motor) may spin clockwise or counterclockwise, thereby moving the cable 38, which may be wrapped around the enclosure 32 (e.g., the enclosure 32 may turn, the enclosure 32 may be disposed on and/or include a turntable 88 as seen in FIG. 8, etc.). Such movement of the cable 38 may cause the enclosure 32 and/or turntable 88 to move clockwise or counterclockwise between the first and second rotation positions.

The actuating element 34 may be programmed to rotate the enclosure 32 automatically or may rotate the enclosure 32 manually. When programmed to rotate the enclosure 32 automatically, the actuating element 34 may be connected to a microprocessor 70 via a circuit link 74. The microprocessor 70 may include at least one input 71, 72, and 73, and at least one output or communication link 74 and 75. The microprocessor 70 may be programmed to cause (e.g., by sending a signal via link or output 74) the actuating element 34 to rotate the enclosure 32 upon detection of at least one event. The microprocessor 70 may detect the at least one event due to the at least one input 71, 72, and 73. The at least one input 71, 72, and 73 may be connected to various types of sensors (e.g., temperature sensors, motion sensors, door sensors, etc.) that send a signal to the microprocessor 70 upon detection of an event. In response to such a signal, the microprocessor 70 may be programmed to perform/execute a specific action. For example, the microprocessor 70 may send a signal to the actuating element 34 to rotate the enclosure 32 of the apparatus 30 automatically when the microprocessor 70 detects that the electronic device 39 is inserted into the enclosure 32 (e.g., at least one input 71, 72, and 73 may be connected to a motion sensor monitoring the enclosure 32). Additionally, the actuating element 34 may rotate the enclosure 32 automatically to the at least one second rotation position in response to at least one of: a key being removed from an ignition of the vehicle, the vehicle being shut off (e.g., a sensor monitors the ignition of a vehicle), the one or more electronic devices 39 entering a sleep mode due to inactivity, and the one or more electronic devices 39 being shut off (e.g., the device 39 may be connected to the microprocessor 70 such that the microprocessor 70 monitors the activity of the device 39). The enclosure 32 of the apparatus 30 may also automatically rotate to a default position (e.g., the at least one second rotation position) when an electrical system (e.g., an anti-theft alarm system) of the vehicle signals a break-in. For example, the at least one input 71, 72, and 73 of the microprocessor 70 may be connected to an anti-theft or security device. Such an automatic response secures the electronic device 39 within the housing 31 such that the electronic device 39 is protected from theft, extreme environmental conditions, etc. Thus, no manual reconfiguration of the enclosure 32 of the apparatus 30, or manual stowing of the apparatus 30 or any attached electronic device 39 may be needed when parking the vehicle because the electronic device 39 is already stowed in the apparatus 30, which is safely connected to the vehicle.

In accordance with at least one aspect of the present invention, the methods and apparatus related to the microprocessor 70 as described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures is shown as having the microprocessor 70 located outside of the housing 31, the microprocessor 70 may be integrated with any component, such as the actuating element 34, the housing 31, the enclosure 32, etc. The microprocessor 70 may also be located in another area of the vehicle. Still further, the various aspects of the invention may be implemented by way of software and/or firmware program(s) that may be stored on suitable storage medium or media (such as floppy disk(s), memory chip(s), etc.) for transportability and/or distribution.

In at least one embodiment, a driver or passenger(s) may manually actuate the actuating element 34 to manually rotate the enclosure 32 of the apparatus 30. For example, the actuating element 34 may be connected to a knob that extends out of a vehicle component (e.g., the Instrument Panel 46) and into the vehicle interior such that the driver or passenger(s) may turn the knob to rotate the actuating element 34 clockwise or counterclockwise as aforementioned. Alternatively, the driver may simply grasp the enclosure 32 (if it is accessible) and rotate same. The driver and/or passenger of the vehicle may rotate the enclosure 32 manually to position the enclosure 32, and/or to further adjust the rotation of the enclosure 32 from one or more programmed position(s).

Figure 4A:
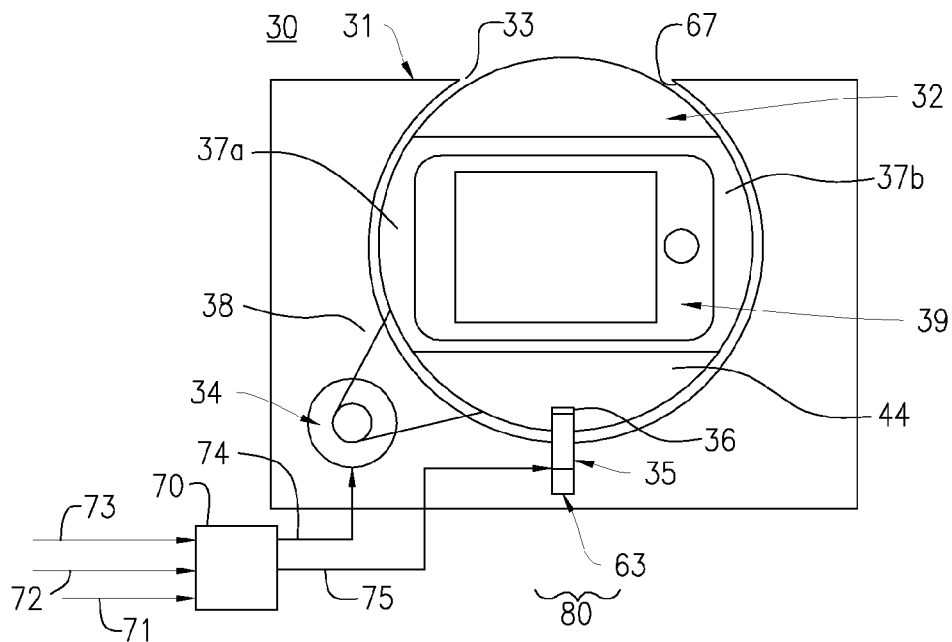
FIG. 4A is a front view of the apparatus of FIG. 3 illustrating an enclosure and housing in rotational and lockable engagement in accordance with at least one embodiment of the present invention.

Either manually or automatically, the enclosure 32 may be rotated within the housing 31 to select or adjust an orientation of information displayed on the at least one electronic device 39. Depending on the proportions of a display screen of the electronic device 39, rotation of the display may effectively utilize, increase, or maximize the viewing area of the information provided because the information may be more optimally displayed in one rotation position rather than another rotation position. As such, the viewing area may be increased or optimized because of the better management and use of the display surface area. For example, a driver or passenger(s) may want to adjust the rotation of the enclosure 32 depending on a type of display of the electronic device 39 that is located within the enclosure 32. For instance, if the electronic device 39 is a media player, the enclosure 32 may be rotated to a "wide" orientation (as best seen in FIGS. 4A and 5) where the display of the device 39 is substantially horizontal. The apparatus 30 allows smaller and/or less expensive displays to be used for in-vehicle "infotainment" applications, which are defined as applications that can provide entertainment while providing information.

Figure 6A:
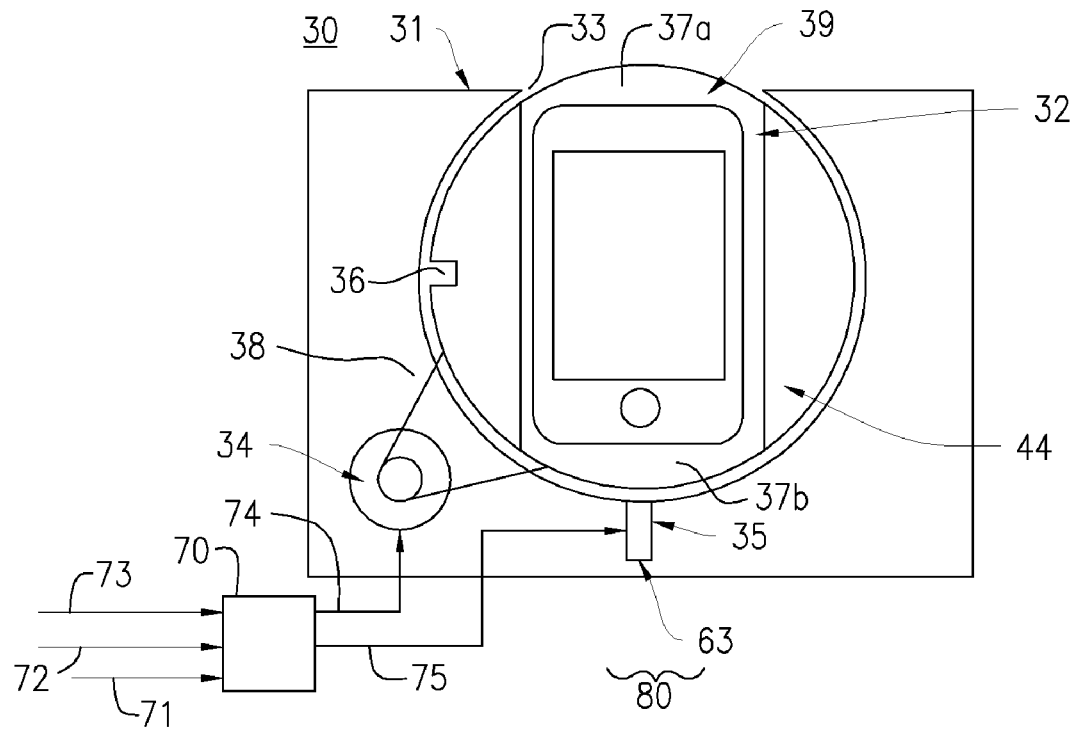
FIG. 6A is a front view of the apparatus of FIG. 3 illustrating an enclosure and housing in rotational and lockable engagement in accordance with at least one embodiment of the present invention.
Figure 7:
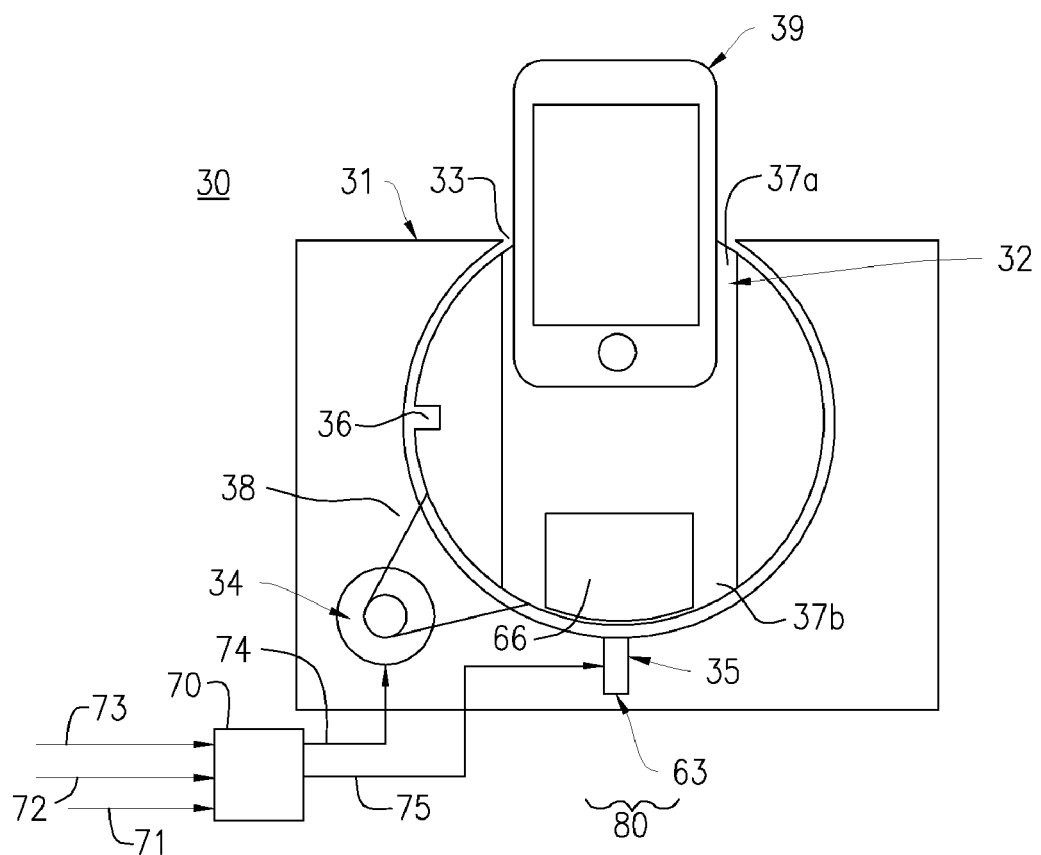
FIG. 7 is a front view of the apparatus of FIG. 3 illustrating an enclosure and housing in rotational and lockable engagement in accordance with at least one embodiment of the present invention.
Figure 8:
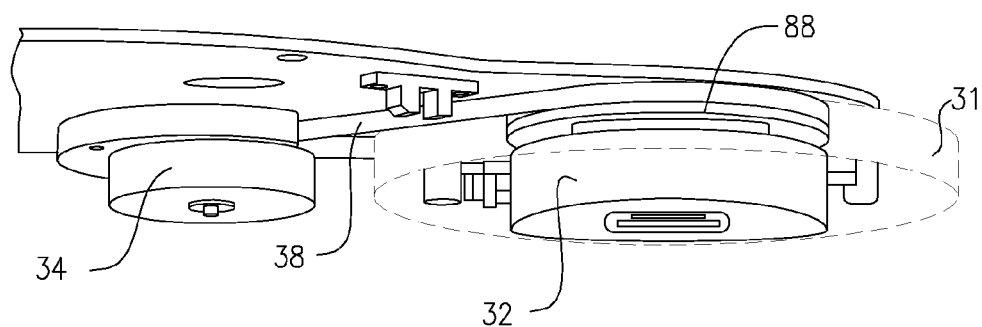
FIG. 8 is a perspective view of an embodiment of an actuating element that is suitable for use in the apparatus of FIG. 3.

In another embodiment, if the electronic device 39 is a navigation system, the enclosure 32 may be rotated to a "tall" orientation (as best seen in FIGS. 6A and 7) where the display of the device 39 is substantially vertical. The driver or passenger viewing the information displayed in either orientation benefits from an improved or substantially maximum width for the information shown, such as, but not limited to, lines of text, pictures, maps, or the like. For example, when a map is displayed in the "tall" configuration, the information displayed may indicate the configuration of streets ahead of the vehicle. As such a driver or passenger viewing the navigation information of the electronic device 39 may benefit from the larger vertical dimension because the driver and/or passenger would receive spatial information (e.g., that the driver should make a left turn at the next street, the driver should continue along a highway for a predetermined distance, etc.). As such, the driver or passenger would be provided with the reality or illusion that the electronic device 39 is displaying the driver's and/or passengers' position along the road as the vehicle moves. The one or more electronic devices 39 may include, but are not limited to, media players, telephones, computers, navigation systems, or the like.

The apparatus 30 may further include at least one window 44 disposed on the housing 31 and/or the enclosure 32 such that information displayed on the at least one electronic device 39 is viewable through the window 44. The window 44 may be transparent or translucent such that a driver and/or a passenger may view the electronic device 39 when operating within the housing 31. The window 44 may include a transparent material that prevents removal of the at least one electronic device 39 from the enclosure 32. The at least one window 44 may be sized and shaped to permit only a portion of the at least one electronic device 39 to be viewable through the window 44, only a display of the at least one electronic device 39 to be viewable through the window 44, and/or substantially all of the electronic device 39 to be viewable through the window 44.

The window 44 may improve or magnify the information displayed on the at least one electronic device 39. For example, the window 44 may include a magnifying glass feature, or the like. However, the window 44 may also become tinted, covered, or at least partially opaque when the device 39 is not being used, goes into a sleep mode due to inactivity, or is shut off.

Figure 4B:
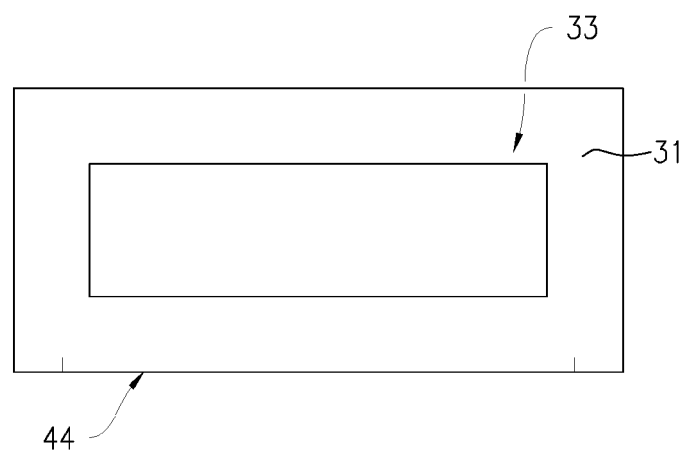
FIG. 4B is an overhead view of the apparatus of FIG. 3 illustrating an enclosure and housing in rotational and lockable engagement in accordance with at least one embodiment of the present invention.
Figure 6B:
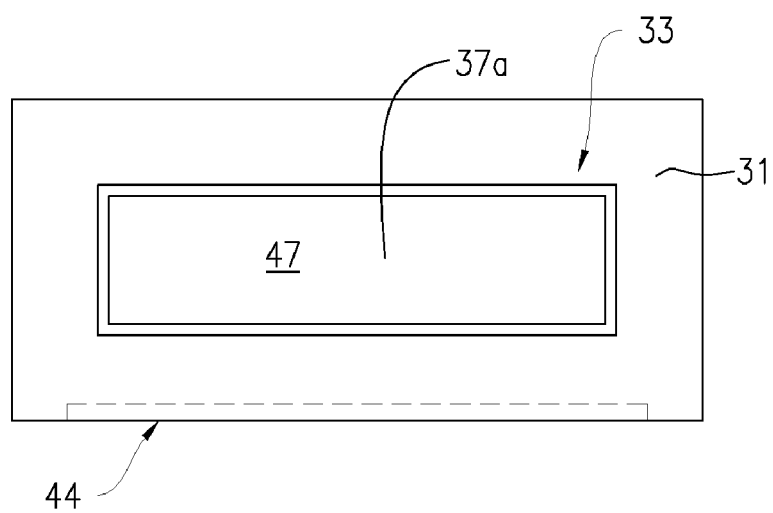
FIG. 6B is an overhead view of the apparatus of FIG. 3 illustrating an enclosure and housing in rotational and lockable engagement in accordance with at least one embodiment of the present invention.

When included in the housing 31 (as best seen in FIGS. 3, 4B, and 6B), the window 44 may cover the enclosure 32, and thereby, cover the electronic device 39 when the electronic device 39 is placed in the housing 31. As illustrated in FIGS. 3-8, the window 44 may be disposed on and/or in a side of the housing 31 such that the enclosure 32 and the electronic device are covered. The at least one electronic device 39 may be disposed between the window 44 and a back of the enclosure 32 as illustrated in the overhead views of FIGS. 4B and 6B. Alternatively, the window 44 may be disposed on and/or in a side of the enclosure 32 such that the at least one electronic device 39 is covered. The window 44 may be made of a durable material, such as glass, polymer, or the like.

Alternatively, the window 44 may be an unobscured aperture that does not distort information displayed on a screen of the housed electronic device 39, and may be sized and shaped such that it does not permit the at least one electronic device 39 to pass through the aperture of the window 44. For example, the window 44 may prevent the at least one electronic device 39 from being received into and removed from the inner volume 47 while the first and second apertures 37a and 33 are not in registration. As such, the window 44 protects the electronic device 39 from being removed from the housing 31 without permission. When the window 44 is an unobscured aperture and does not include material as aforementioned, the display screen of the electronic device 39 may provide sufficient protection for the device 39 (e.g., from vibrations, objections entering the aperture of the window 44 towards the device 39, liquids, environmental conditions, etc.).

The apparatus 30 may further include an ejection mechanism 66 (as best seen in FIGS. 5 and 8) disposed in and/or on the enclosure 32 and operating to communicate with the at least one electronic device 39 for facilitating removal of the at least one electronic device 39 by urging the device 39 out of the inner volume 47 of the enclosure 32 and out of the housing of the apparatus 30. The ejection mechanism 66 may be disposed on the enclosure 32 (such as in one of the one or more apertures 37a and 37b, in the middle of the enclosure 32 such that the surface area of the enclosure 32 may be divided between two or more electronic devices 39, etc.). The ejection mechanism 66 may be locked into a first position (as best seen in FIG. 5) when the at least one electronic device 39 is received into the inner volume 47 of the enclosure 32 and is pushed a first time against the ejection mechanism 66. For example, a driver and/or passenger may push a device 39 into the enclosure for housing and viewing. The ejection mechanism 66 may be unlocked from the first position when the at least one electronic device 39 is pushed a second time against the ejection mechanism 66. For example, when the driver and/or passenger wants to remove the device 39 after use or to switch another device 39 into the enclosure 32 and/or housing 31, the driver and/or passenger pushes down on the device 39 to activate the ejection mechanism 66. When unlocked from the first position (as best seen in FIG. 8), the ejection mechanism 66 may display a spring-like effect that pushes the at least one electronic device 39 towards the first and second apertures 37a and 33 in registration for removal therefrom. When the ejection mechanism 66 is activated, the ejection mechanism 66 springs outwards, and, thereby, urges, pushes, or ejects the device 39 partly or wholly out of the enclosure 32 and/or housing 31. An ejection mechanism known to those skilled in the art may be employed, such as, but not limited to, a push-push mechanism 66 as shown in FIGS. 5 and 8, a spring, a powered ejection element, an electromechanical solenoid, etc.

Additionally or alternatively, locking the position of the enclosure 32 would provide the advantage of preventing the device 39 from being removed from the apparatus 30 without permission. The locking mechanism may be actuated by a driver and/or passenger(s) using the apparatus 30, thereby permitting the user to unlock and lock the rotation of the enclosure 32 within the housing 31. The locking mechanism may be actuated by the microprocessor 70 via the communication link or output 75 of the microprocessor 70. The apparatus 30 may further include a locking mechanism 80 that prevents rotation of the enclosure 32 within the housing 31 when actuated. The locking mechanism 80 may include a first receiver 36 within the enclosure 32 and/or a second receiver 63 within the housing 31, and a locking member 35 operating to slidingly engage the receiver 36 and/or 63 when actuated. For example, the microprocessor 70 may send a command via the link or output 75 for the locking member 35 to slide into and/or out of either receiver 36 and 63. In at least one embodiment, the enclosure 32 may communicate with the locking member 35 (as best shown in FIGS. 4A-7). The locking member 35 may be disposed partly or in whole in the second receiver 63 of the housing 31, and may move in and out of the first receiver 36 in communication with a portion of the enclosure 32 when the enclosure 32 moves between the locked position and the unlocked position, respectively.

FIGS. 4A-5 illustrate at least one embodiment of the enclosure 32 when in a locked position. When the locking member 35 is at least partly disposed in both the first receiver 36 and the second receiver 63, the locking member 35 prevents the enclosure 32 from rotating. The locking member 35 may be engageable within the first receiver 36 and/or the second receiver 63 only when the enclosure 32 is rotated into the at least one second rotation position (as best seen in FIG. 4B). For example, when the enclosure 32 is rotated into the at least one second rotation position, the locking member 35 may operate to slidingly engage the first receiver 36 such that the locking member 35 prevents the enclosure 32 from being rotating out of the at least one second rotation position. FIGS. 6A-7 illustrate at least one embodiment of the enclosure 32 when in an unlocked position. When the locking member 35 is retracted from the first and/or second receivers 36 and/or 63, the enclosure 32 may rotate freely without interference from the locking member 35. For example, the locking member 35 may disengage the first receiver 36 and/or the second receiver 63 so that the enclosure 32 may be rotated between the at least one second rotation position and the at least one first rotation position (as best seen in FIG. 4A).

The locking member 35 may be moved by any actuating device known to those skilled in the art, such as but not limited to, a turntable motor, an electromechanical solenoid, or the like. A driver and/or passenger may manually lock or unlock the enclosure 32 (e.g., by manually sliding the locking member 35) when moving the device 39 into a desired position. The locking member 35 may lock the enclosure 32 in at least one of the first and second rotation positions. Additionally, even when the locking member 35 is not actuated and does not prevent the enclosure 32 from rotating, the enclosure 32 may still be in one of the at least first and second rotation positions such that the electronic device 39 may be received and removed (e.g., unlocked) and may not be received and removed (e.g., locked) from the enclosure 32.

Figure 9:
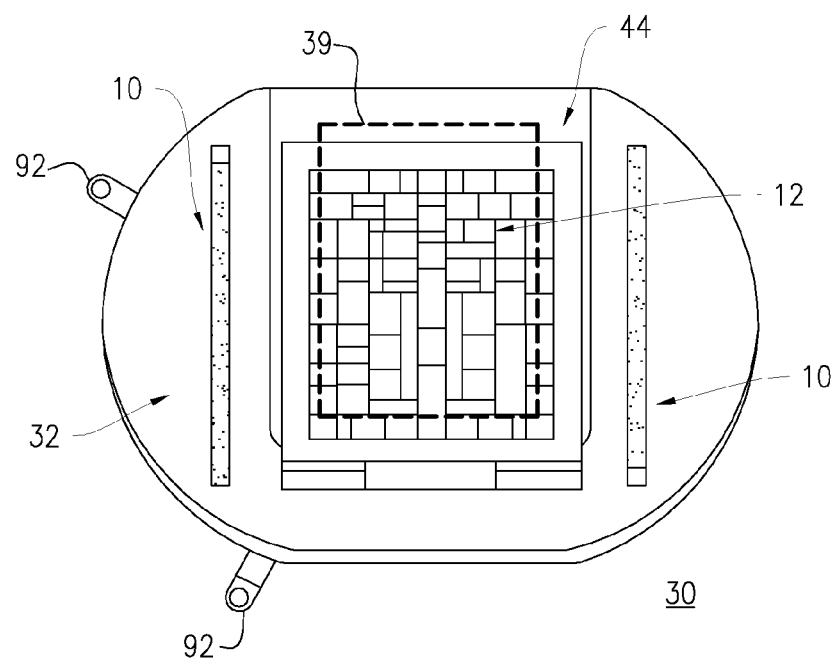
FIG. 9 is a perspective view of an enclosure including several environment-controlling components suitable for use with the apparatus of FIG. 3.

Alternatively or additionally, the apparatus 30 may control and/or mitigate environmental conditions affecting the device. In particular, apparatus 30 may include environment-controlling components 10 and/or 12 (as best seen in FIG. 9). The one or more environment-control elements 10 and/or 12 may be disposed on and/or in at least one of the enclosure 32 and the housing 31, and may maintain one or more environmental factors within the inner volume 47 of the enclosure 32 to prevent the at least one electronic device 39 (shown in dashed lines in FIG. 9) from sustaining damage and/or becoming temporarily non-functional.

The environment-controlling components, such as environment element 10, a heating and cooling element 12, etc., may be located in between the window 44 and a wall of the enclosure 32 such that a device 39 may be placed in between the heating and cooling element 12 and the window 44. The apparatus 30 may further include screw placements 92 for docking and/or integrating the apparatus 30 into a vehicle component, such as but not limited to the cockpit/IP 46, a door, a back of a chair of a vehicle, etc. The housing 31 and/or the enclosure 32 may comprise passive phase change material in part or in whole. Depending on the environmental limitations of the electronic device 39 placed into the apparatus 30, the electronic device may require a controlled temperature range for operability. The passive phase change material of enclosure 32 and/or housing 31 may be made to have various phase transition temperatures. For example, the phase change material of enclosure 32 and/or housing 31 may have a freezing point of 80° F., 110° F., or the like. The passive phase change material employs ambient air to absorb heat or cold energy to reach a desired temperature. For example, when a vehicle remains exposed to cold weather over night, the passive phase change material may freeze and, thereby, store the cold energy. During the next day when the temperature gets warmer, the passive phase change material melts and transfers the stored cold energy to the electronic device to keep the device cool.

The environment-control components, such as environment element 10 and heating and cooling element 12, can include, but are not limited to, Peltier cooling or heating devices, resistive element heating devices, phase change materials, desiccant materials, active or passive vibration control components, or the like. The environment element 10 may comprise a supplementary heating element, one or more desiccant materials, and active or passive vibration control components. The desiccant materials promote drying and, thereby, control humidity. The phase change materials may be placed within a gel pack, or the like.

The at least one second aperture 33 may include a finger groove 43 (as best seen in FIG. 3) for easy access to the electronic device 39 when removing the device 39 from the apparatus 30 and inserting the device 39 into the apparatus 30.

Alternatively or additionally, the enclosure 32 may form a portion of the housing 31 such that the enclosure 32 completes the housing 31 around the one or more electronic devices 39 (e.g., the enclosure 32 may act as a wall, wholly or in part, of the housing 31). For example, the housing 31 may further include a recess 67 (as best seen in FIG. 4A) in communication with a wall of the housing 31. The recess 67 may be sized and shaped such at least a portion of the enclosure 32 mates with the recess 67. The recess 67 may receive a portion of the enclosure 32 such that the enclosure 32 may be in communication with a wall of the housing 31. The enclosure 32 may rotate the at least one electronic device 39 within the housing 31 and may seal the recess 67 of the housing 31 to prevent theft of the device 39.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. An apparatus for securing at least one electronic device within a vehicle, comprising:
    an enclosure defining an inner volume and including a first aperture for receiving the electronic device into, and removing the electronic device from, the inner volume; and
    a housing containing the enclosure and including a second aperture
    at least one window disposed on the housing and the enclosure such that information displayed on the at least one electronic device is viewable therethrough,
    wherein the enclosure is rotatable within the housing about an axis of rotation, such that: (i) in at least one first rotation position the first and second apertures are in registration with one another and the electronic device may be received within and removed from the inner volume through both apertures, (ii) in at least one second rotation position, different from the first rotation position, the first and second apertures are not in registration with one another and the electronic device may not be received within or removed from the inner volume through both apertures, and (iii) the window faces a direction parallel to the axis of rotation of the enclosure within the housing.

2. The apparatus of claim 1, further comprising an actuating element coupled to, and operating to, rotate the enclosure within the housing.

3. The apparatus of claim 2, wherein: (i) the enclosure does not rotate when the actuating element is not rotating; and (ii) the enclosure rotates when the actuating element rotates.

4. The apparatus of claim 2, wherein the actuating element rotates the enclosure automatically to the at least one second rotation position in response to at least one of: the vehicle being shut off, the one or more electronic devices entering a sleep mode due to inactivity, a key being removed from an ignition of the vehicle, and the one or more electronic devices being shut off.

5. The apparatus of claim 1, wherein the housing is integrated within:
    a door, a cockpit/Instrument Panel, an armrest, a center console, and a back of a seat of the vehicle.

6. The apparatus of claim 1, wherein the enclosure is removable from the housing such that any of a plurality of enclosures is insertable into the housing and may accommodate one or more different electronic devices.

7. The apparatus of claim 1, wherein an orientation of information displayed on the at least one electronic device is adjustable by rotation of the enclosure within the housing.

8. The apparatus of claim 1, wherein the window magnifies the information displayed on the at least one electronic device.

9. The apparatus of claim 1, wherein the at least one electronic device is disposed between the window and a back of the enclosure.

10. The apparatus of claim 1, wherein:
    (i) the window is an unobscured aperture that does not distort information displayed on a screen of the housed electronic device; and
    (ii) the window is sized and shaped such that it does not permit the at least one electronic device to pass therethrough.

11. The apparatus of claim 1, wherein the window includes a transparent material that prevents removal of the at least one electronic device from the enclosure.

12. The apparatus of claim 1, wherein the at least one window is sized and shaped to permit one of:
    (i) only a portion of the at least one electronic device to be viewable therethough;
    (ii) only a display of the at least one electronic device to be viewable therethough; and
    (iii) substantially all of the electronic device to be viewable therethrough.

13. The apparatus of claim 1, further comprising an ejection mechanism disposed in the enclosure and operating to urge the at least one electronic device out of the enclosure.

14. The apparatus of claim 13, wherein the ejection mechanism communicates with the at least one electronic device such that: (i) the ejection mechanism is locked into a first position when the at least one electronic device is received into the inner volume of the enclosure and is pushed a first time against the ejection mechanism; and (ii) the ejection mechanism is unlocked from the first position when the at least one electronic device is pushed a second time against the ejection mechanism, and displays a spring-like effect that pushes the at least one electronic device towards the first and second apertures, when in registration, for removal therefrom.

15. The apparatus of claim 1, further comprising one or more environment-control elements disposed at least one of on and in at least one of the enclosure and the housing, wherein the one or more environmental-control elements maintain one or more environmental factors within the inner volume of the enclosure to prevent the at least one electronic device from at least one of sustaining damage and becoming temporarily non-functional.

16. The apparatus of claim 15, wherein the one or more environmental factors includes at least one of: temperature, humidity, and vibration.

17. The apparatus of claim 15, wherein the one or more environment-control elements include at least one of: Peltier cooling or heating devices, resistive element heating devices, phase change materials, phase change materials disposed in a gel pack, desiccant materials, a supplementary heating element, a supplementary cooling element, and active or passive vibration control components.

18. The apparatus of claim 1, further comprising a locking mechanism that prevents rotation of the enclosure within the housing when actuated.

19. The apparatus of claim 18, wherein the locking mechanism includes:
- a receiver within one of the housing and the enclosure; and
- a locking member operating to slidingly engage the receiver when actuated.

20. The apparatus of claim 19, wherein the locking member is engageable within the receiver only when the enclosure is rotated into the at least one second rotation position.

21. The apparatus of claim 18, wherein the locking mechanism is actuated by a user of the apparatus, thereby permitting the user to unlock and lock the rotation of the enclosure within the housing.

* * * * *